United States Patent
Toyama (10) Patent No.: US 12,322,208 B2
(45) Date of Patent: Jun. 3, 2025

(54) DETERMINING WHETHER OR NOT IRIS INFORMATION CAN BE EXTRACTED FROM PHOTOGRAPH IMAGE BY USING MACHINE LEARNING MODEL

(71) Applicant: NEC Corporation, Tokyo (JP)

(72) Inventor: Hiroaki Toyama, Tokyo (JP)

(73) Assignee: NEC CORPORATION, Tokyo (JP)

(*) Notice: Subject to any disclaimer, the term of this patent is extended or adjusted under 35 U.S.C. 154(b) by 328 days.

(21) Appl. No.: 17/910,101

(22) PCT Filed: Mar. 27, 2020

(86) PCT No.: PCT/JP2020/014372
§ 371 (c)(1),
(2) Date: Sep. 8, 2022

(87) PCT Pub. No.: WO2021/192311
PCT Pub. Date: Sep. 30, 2021

(65) Prior Publication Data
US 2023/0113390 A1    Apr. 13, 2023

(51) Int. Cl.
G06V 40/18    (2022.01)
G06T 7/70    (2017.01)

(52) U.S. Cl.
CPC ............. *G06V 40/197* (2022.01); *G06T 7/70* (2017.01); *G06T 2207/20081* (2013.01); *G06T 2207/30041* (2013.01)

(58) Field of Classification Search
CPC ..... G06T 7/10; G06T 7/11; G06T 7/12; G06T 7/194; G06T 7/0002; G06T 2207/10024; G06T 2207/20076; G06T 2207/20081; G06T 2207/20084; G06T 2207/30041; G06T 2207/30168; G06T 2207/30196
See application file for complete search history.

(56) References Cited

U.S. PATENT DOCUMENTS

| | | | |
|---|---|---|---|
| 2017/0206412 A1* | 7/2017 | Kaehler | ................. G06V 20/20 |
| 2018/0089834 A1 | 3/2018 | Spizhevoy et al. | |
| 2018/0218212 A1 | 8/2018 | Yoshikawa et al. | |

FOREIGN PATENT DOCUMENTS

| | | |
|---|---|---|
| JP | 2006-163683 A | 6/2006 |
| JP | 2009-015518 A | 1/2009 |
| JP | 2018-124733 A | 8/2018 |
| JP | 2019-530909 A | 10/2019 |
| JP | 2019-530929 A | 10/2019 |

OTHER PUBLICATIONS

International Search Report for PCT Application No. PCT/JP2020/014372, mailed on Jun. 16, 2020.
Communication dated Apr. 4, 2023 issued by the Japanese Intellectual Property Office in counterpart Japanese Application No. 2022-509208.

* cited by examiner

*Primary Examiner* — Kent Yip (57) ABSTRACT

A determination apparatus includes an acquisition unit that acquires a photograph image obtained by photographing a user, a storage unit that stores a first learning model constructed through machine learning using teacher data in which a plurality of images of eyes are associated with labels each indicating whether or not an iris can be extracted, and a first determination unit that inputs the photograph image into the first learning model and determines whether or not iris information can be extracted based on an output from the first learning model.

4 Claims, 10 Drawing Sheets

DETERMINING WHETHER OR NOT IRIS INFORMATION CAN BE EXTRACTED FROM PHOTOGRAPH IMAGE BY USING MACHINE LEARNING MODEL

This application is a National Stage Entry of PCT/JP2020/014372 filed on Mar. 27, 2020, the contents of all of which are incorporated herein by reference, in their entirety.

TECHNICAL FIELD

The disclosure relates to a determination apparatus, a method, and a non-transitory computer readable medium storing a program, and in particular relates to a determination apparatus for an authentication image, a method, and a non-transitory computer readable medium storing a program.

BACKGROUND ART

Patent Literature 1 discloses an electronic apparatus that urges (e.g., instructs) a user to perform a predetermined operation when an image of his/her eye(s) for iris authentication could not be appropriately taken. For example, when the size of the iris area in the photograph image is equal to or smaller than a threshold size, the electronic apparatus presents (i.e., shows) a message to the user urging (e.g., instructing) the user to open his/her eyes.

CITATION LIST

Patent Literature

Patent Literature 1: Japanese Unexamined Patent Application Publication No. 2018-124733

SUMMARY OF INVENTION

Technical Problem

According to the technology disclosed in Patent Literature 1, it is not possible to determine whether a photograph image for iris authentication is appropriate or not unless an iris(es) is detected from the photograph image.

The disclosure has been made in order to solve the above-described problem, and an object thereof is to provide a determination apparatus, a method, and a program capable of efficiently acquiring information used for iris authentication.

Solution to Problem

A determination apparatus according to the disclosure includes: acquisition means for acquiring a photograph image obtained by photographing a user; storage means for storing a first learning model constructed through machine learning using teacher data in which a plurality of images of eyes are associated with labels each indicating whether or not an iris can be extracted; and first determination means for inputting the photograph image into the first learning model and determining whether or not iris information can be extracted based on an output from the first learning model.

A determination method according to the disclosure includes: acquiring, by a computer in which a first learning model is stored, a photograph image obtained by photographing a user, the first learning model being a model that is constructed through machine learning using teacher data in which a plurality of images of eyes are associated with labels each indicating whether or not iris information can be extracted; and inputting the photograph image into the first learning model and determining whether or not iris information can be extracted based on an output from the first learning model.

A determination program according to the disclosure is a program for a computer in which a first learning model is stored, the first learning model being a model that is constructed through machine learning using teacher data in which a plurality of images of eyes are associated with labels each indicating whether or not iris information can be extracted, the determination program being configured to cause the computer to perform: a process for acquiring a photograph image obtained by photographing a user; and a process for inputting the photograph image into the first learning model and determining whether or not iris information can be extracted based on an output from the first learning model.

Advantageous Effects of Invention

According to the disclosure, it is possible to provide a determination apparatus, a method, and a program capable of efficiently acquiring information used for iris authentication.

EXAMPLE EMBODIMENT

An example embodiment according to the disclosure will be described hereinafter in detail with reference to the drawings. The same reference numerals (or symbols) are assigned to the same or corresponding elements throughout the drawings, and redundant descriptions thereof are omitted as appropriate for clarifying the description.

First Example Embodiment

Figure 1:
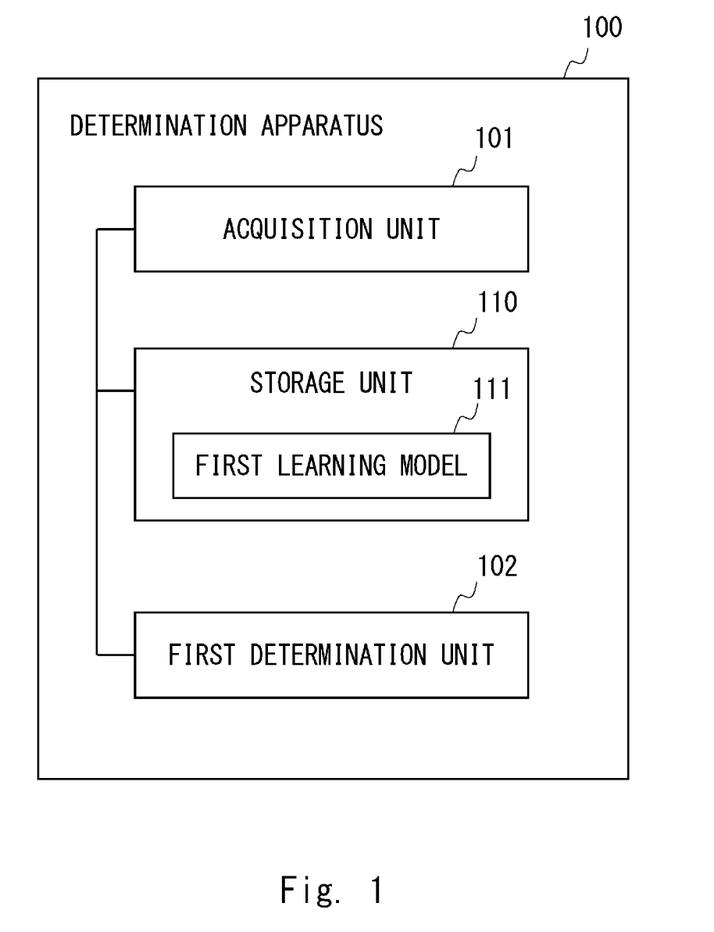
FIG. 1 is a block diagram showing a configuration of a determination apparatus according to a first example embodiment.

FIG. 1 is a block diagram showing a configuration of a determination apparatus 100 according to a first example embodiment. The determination apparatus 100 includes an acquisition unit 101, a storage unit 110, and a first determination unit 102. The determination apparatus 100 may be an authentication apparatus that performs iris authentication.

The acquisition unit 101 acquires a photograph image obtained by photographing a user. The storage unit 110 stores therein a first learning model 111. Note that the first learning model 111 is constructed through machine learning using teacher data in which a plurality of images of eyes are associated with labels each indicating whether or not iris information can be extracted. The image from which iris information can be extracted is, for example, an image in which an eye(s) shown therein is sufficiently opened. The image from which iris information cannot be extracted is, for example, an image in which an eye(s) shown therein is closed or half closed.

The first determination unit 102 inputs the photograph image acquired by the acquisition unit 101 into the first learning model 111 stored in the storage unit 110. Then, the first determination unit 102 determines whether or not iris information can be extracted from the photograph image based on an output from the first learning model 111.

The determination apparatus 100 may perform iris authentication or iris registration according to the result of the determination by the first determination unit 102. Further, the determination apparatus 100 may make (e.g., instruct) an external apparatus to perform iris authentication or iris registration according to the result of the determination by the first determination unit 102.

Figure 2:
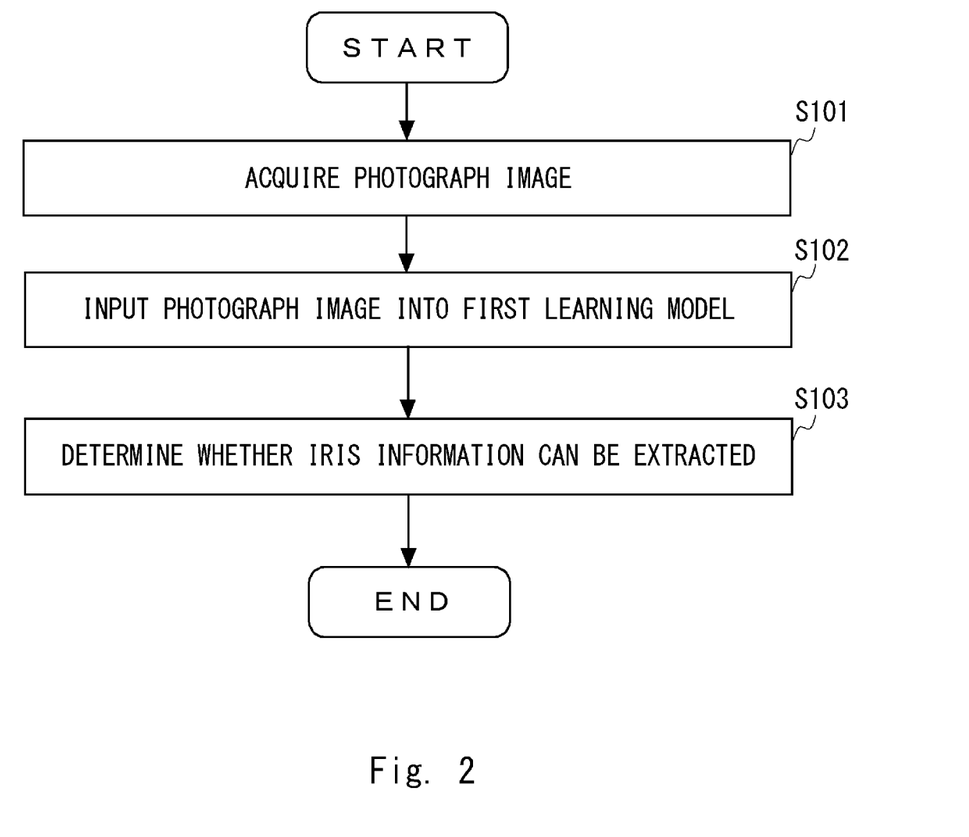
FIG. 2 is a flowchart showing a flow of a determination method according to the first example embodiment.

FIG. 2 is a flowchart showing a flow of an authentication method according to the first example embodiment. Note that it is assumed that the first learning model 111 is stored in the storage unit 110 of the determination apparatus 100. Firstly, the acquisition unit 101 acquires a photograph image obtained by photographing a user (Step S101). It is assumed that at least an eye area(s) of the user is shown in the first photograph image.

Next, the first determination unit 102 inputs the photograph image acquired in the step S101 into the first learning model 111 (Step S102). Next, the first determination unit 102 determines whether or not iris information can be extracted based on an output from the first learning model (Step S103).

As described above, in the past, when it is determined whether a photograph image for iris authentication is appropriate or not, an iris(es) needs be detected from the photograph image. Since the determination apparatus according to this example embodiment determines whether the photograph image is appropriate or not by using the machine learning model, it is unnecessary to detect an iris(es) from the photograph image. By using the determination apparatus according to this example embodiment, the processing load for performing iris authentication or iris registration is reduced.

Figure 10:
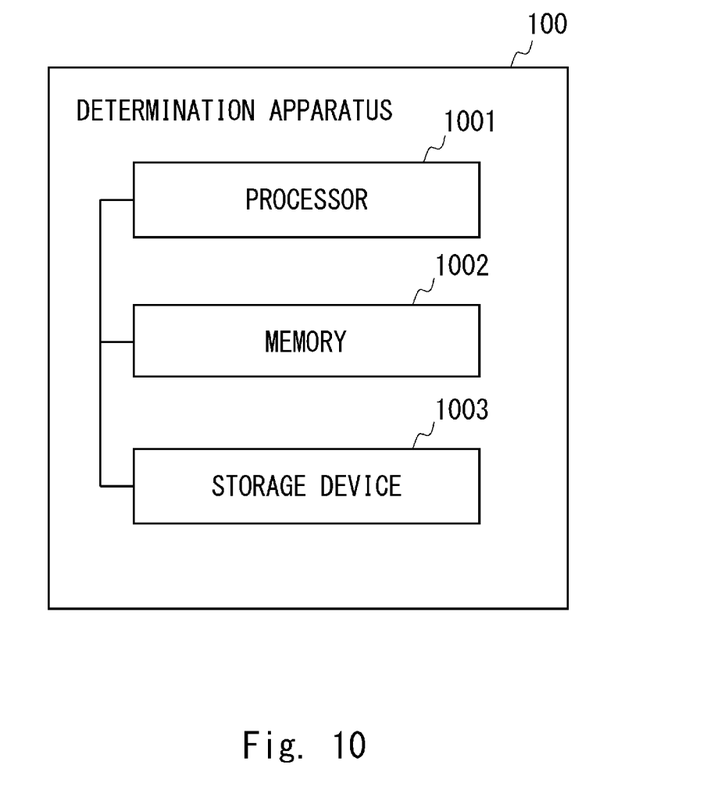
FIG. 10 shows an example of a hardware configuration of a determination apparatus.

FIG. 10 shows an example of a hardware configuration of the determination apparatus 100. The determination apparatus 100 includes a processor 1001, a memory 1002, and a storage device 1003. In the storage device 1003, a computer program in which the processes of the information processing method according to this example embodiment are implemented is stored. Further, the processor 1001 loads the computer program from the storage device 1003 into the memory 1002, and executes the loaded computer program. In this way, the processor 1001 implements the functions of the acquisition unit 101 and the first determination unit 102.

Alternatively, each of the acquisition unit 101 and the first determination unit 102 may be implemented by dedicated hardware. Alternatively, some or all of the components of each apparatus may be implemented by general-purpose or dedicated circuitry, a processor, or a combination thereof. These components may be implemented by using a single chip or may be implemented by using a plurality of chips connected through a bus. Some or all of the components of each apparatus may be implemented by a combination of the above-described circuitry or the like and the program. Further, a CPU (Central Processing Unit), a GPU (Graphics Processing Unit), an FPGA (Field-Programmable Gate Array), or the like can be used as the processor.

Further, in the case where some or all of the components of the determination apparatus 100 are implemented by a plurality of information processing apparatuses, circuitry, or the like, the plurality of information processing apparatuses, circuitry, or the like may be disposed in one place in a concentrated manner or in a plurality of places in a distributed manner. For example, the information processing apparatus, circuitry, or the like may be implemented in a form in which the components or the like are connected through a communication network, i.e., may be implemented as a client-server system, a cloud computing system, or the like. Further, the functions of the determination apparatus 100 may be provided in the form of SaaS (Software as a Service).

Second Example Embodiment

Figure 3:
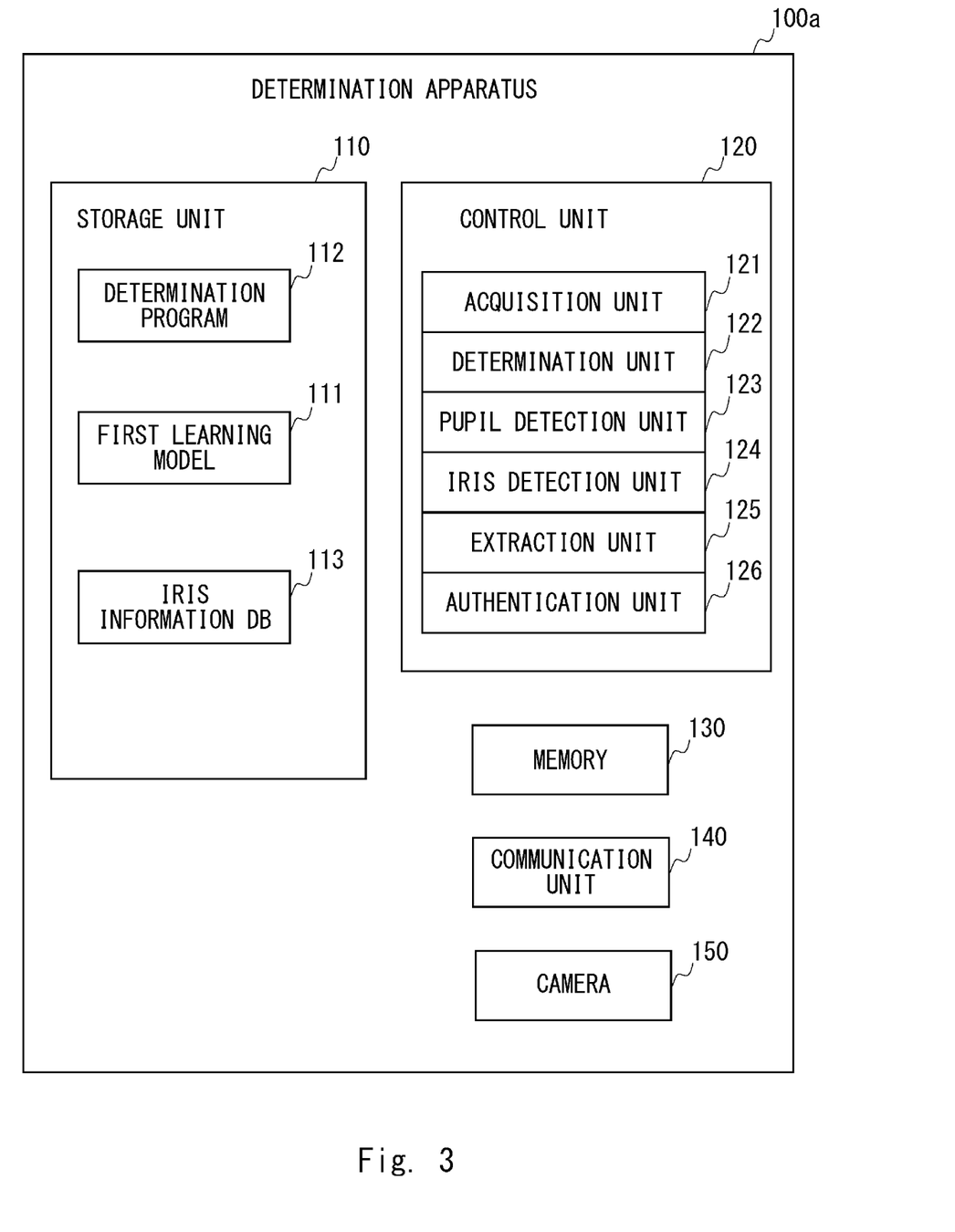
FIG. 3 is a block diagram showing a configuration of a determination apparatus according to a second example embodiment.

The second example embodiment is a specific example of the above-described first example embodiment. FIG. 3 is a block diagram showing a configuration of a determination apparatus 100a according to the second example embodiment. The determination apparatus 100a includes a storage unit 110, a control unit 120, a memory 130, a communication unit 140, and a camera 150.

The storage unit 110 is a storage device such as a hard disk drive or a flash memory. The control unit 120 controls each of the functions of the determination apparatus 100a. The memory 130 is a volatile storage device such as a RAM (Random Access Memory), and is a storage area for temporarily holding information during the operation of the control unit 120. The communication unit 140 is a communication interface with the network 500. The camera 150 takes an image for iris authentication. The camera 150 is, for example, an infrared-light camera.

The storage unit 110 stores therein at least a determination program 112, a first learning model 111, and an iris information DB 113. The determination program 112 is a computer program in which a determination method according to this example embodiment is implemented. The first learning model 111 is a model that is constructed through machine learning using teacher data in which a plurality of images of eyes are associated with labels each indicating whether or not iris information can be extracted. In the iris information DB 113, iris information extracted from an iris image is stored. Note that in the iris information DB 113, a plurality of pieces of iris information of a plurality of users and a plurality of user IDs are stored in a state in which the plurality of pieces of iris information and the plurality of user IDs are associated with each other.

The control unit 120 loads the determination program 112 from the storage unit 110 into the memory 130, and executes the loaded determination program 112. In this way, the control unit 120 implements the functions of an acquisition unit 121, a first determination unit 122, a pupil detection unit 123, an iris detection unit 124, an extraction unit 125, and an authentication unit 126. Note that the acquisition unit 121 is an example of the acquisition unit 101, and the first determination unit 122 is an example of the first determination unit 102.

The acquisition unit 121 acquires a photograph image taken by the camera 150. It is assumed that at least an eye(s) is shown in the photograph image. The photograph image may include an area around a corner(s) of the eye(s). The first determination unit 122 inputs the photograph image acquired by the acquisition unit 121 into the first learning model 111, and determines whether or not iris information can be extracted from the photograph image based on an output from the first learning model 111. That is, the first determination unit 122 determines whether or not the photograph image is appropriate as an image for iris authentication.

The pupil detection unit 123 detects a pupil area from the photograph image according to the result of the determination by the first determination unit 122. The pupil detection unit 123 may detect a pupil area, for example, by detecting a black circle included (i.e., shown) in the photograph image. The iris detection unit 124 detects an iris area located outside (i.e., located around) the pupil area based on the pupil area detected by the pupil detection unit 123.

The extraction unit 125 extracts feature points from the iris area detected by the iris detection unit 124, and outputs iris information to the authentication unit 126. Note that the iris information is a set of feature points extracted from the iris area.

The authentication unit 126 authenticates or registers the iris information extracted by the extraction unit 125. When the authentication unit 126 performs iris authentication, it compares the iris information with data contained in the iris information DB 113 stored in the storage unit 110. The authentication unit 126 outputs information indicating whether or not the iris information is matched. Whether the iris information is matched or not corresponds to the success or failure of the authentication. Note that the authentication unit 126 may output the user ID of a user corresponding to the iris information. When the authentication unit 126 performs iris registration, it newly registers the iris information extracted by the extraction unit 125 in the iris information DB 113. Note that the authentication unit 126 may issue a new user ID.

Figure 4:
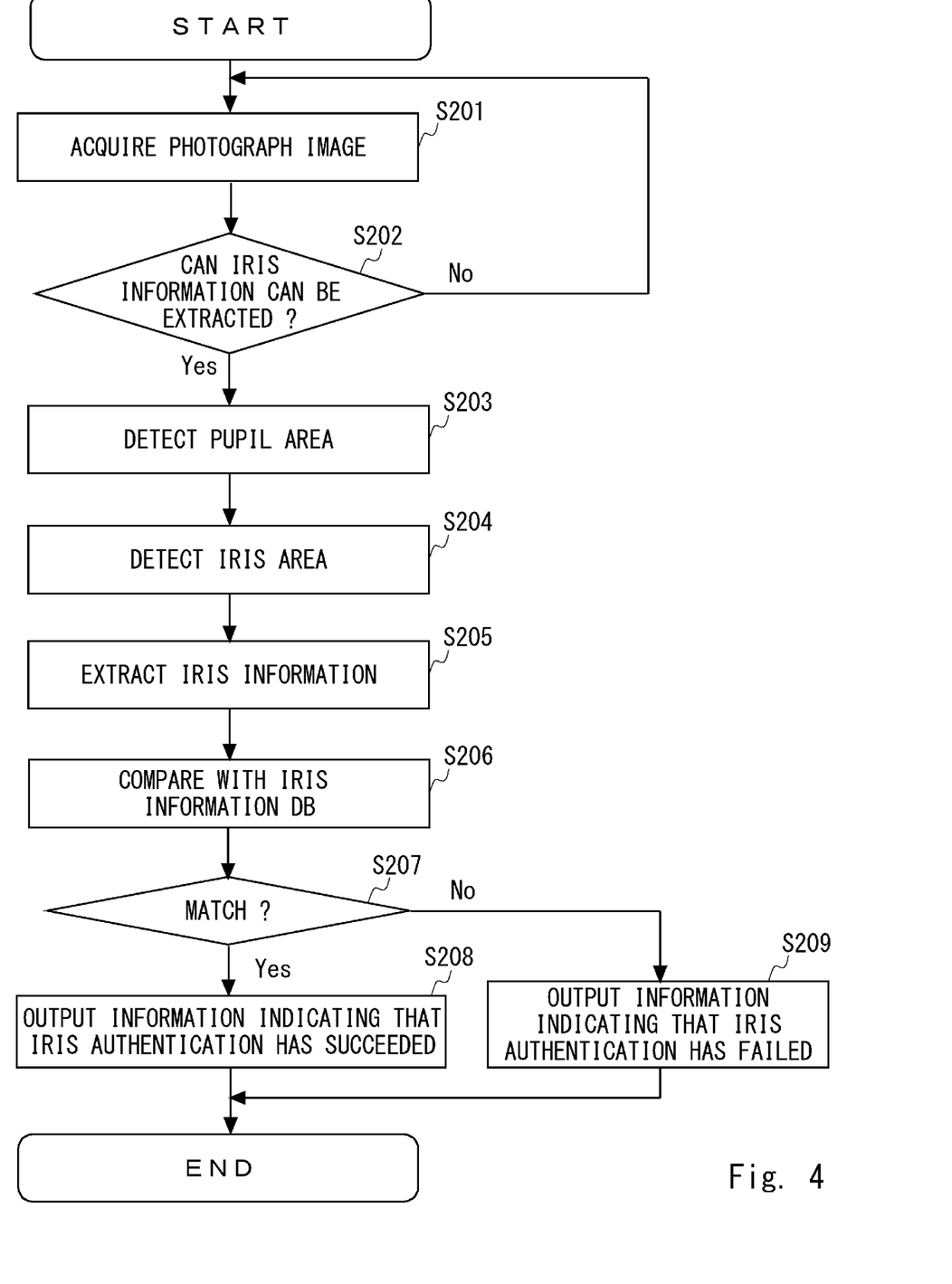
FIG. 4 is a flowchart showing a flow of iris authentication using the determination apparatus according to the second example embodiment.

FIG. 4 is a flowchart showing a flow of processes through which the determination apparatus 100a performs iris authentication. Firstly, the acquisition unit 121 of the determination apparatus 100a acquires a photograph image for iris authentication from the camera 150 (Step S201). Next, the first determination unit 122 inputs the photograph image into the first learning model 111, and determines whether or not an iris can be extracted from the photograph image (Step S202). When the first determination unit 122 determines that an iris cannot be extracted (No in Step S202), the determination apparatus 100a proceeds (i.e., returns) to the step S201 and performs the process for acquiring a photograph image again.

When the first determination unit 122 determines that an iris can be extracted (Yes in Step S202), the pupil detection unit 123 detects a pupil area from the photograph image (Step S203). Next, the iris detection unit 124 detects an iris area based on the pupil area detected in the step S203 (Step S204).

Next, the extraction unit 125 extracts iris information from the iris area detected in the step S204 (Step S205). Next, the authentication unit 126 compares the extracted iris information with data contained in the iris information DB 113 (Step S206). When the iris information matches one of a plurality of pieces of iris information (Yes in Step S207), the authentication unit 126 outputs information indicating that the iris authentication has succeeded (Step S208). On the other hand, when there is no iris information that matches the extracted iris information (No in Step S207), the authentication unit 126 outputs information indicating that the iris authentication has failed (Step S209).

When the iris information is registered, the determination apparatus 100a, after performing the processes in the steps S201 to S205, registers the extracted iris information in the iris information DB 113. Note that the determination apparatus 100a may register the iris information in the iris information DB 113 while associating it with the user ID.

Advantageous effects of this example embodiment will be described hereinafter. It is necessary that an iris be shown in an image used for iris authentication. However, depending on the timing at which an eye is photographed, an image appropriate for acquiring iris information may not be obtained. In such a case, an authentication error occurs even when iris authentication is performed, and it means that useless processing has been performed. In contrast, the determination apparatus 100a according to this example embodiment determines whether or not an iris can be extracted by using a learning model constructed through machine learning, and detects the iris according to the result of the determination, so that it can reduce the processing load.

Note that the determination apparatus 100a does not necessarily have to be implemented by one apparatus. That is, the determination apparatus 100a may be implemented by a plurality of apparatuses having respective different functions. For example, the determination apparatus 100a may be implemented by a terminal(s) and a server. For example, among the functions provided in the control unit 120 of the determination apparatus 100a, the functions of the acquisition unit 121 and the first determination unit 122 may be provided in the terminal, and the other functions may be provided in the server.

Third Example Embodiment

Figure 5:
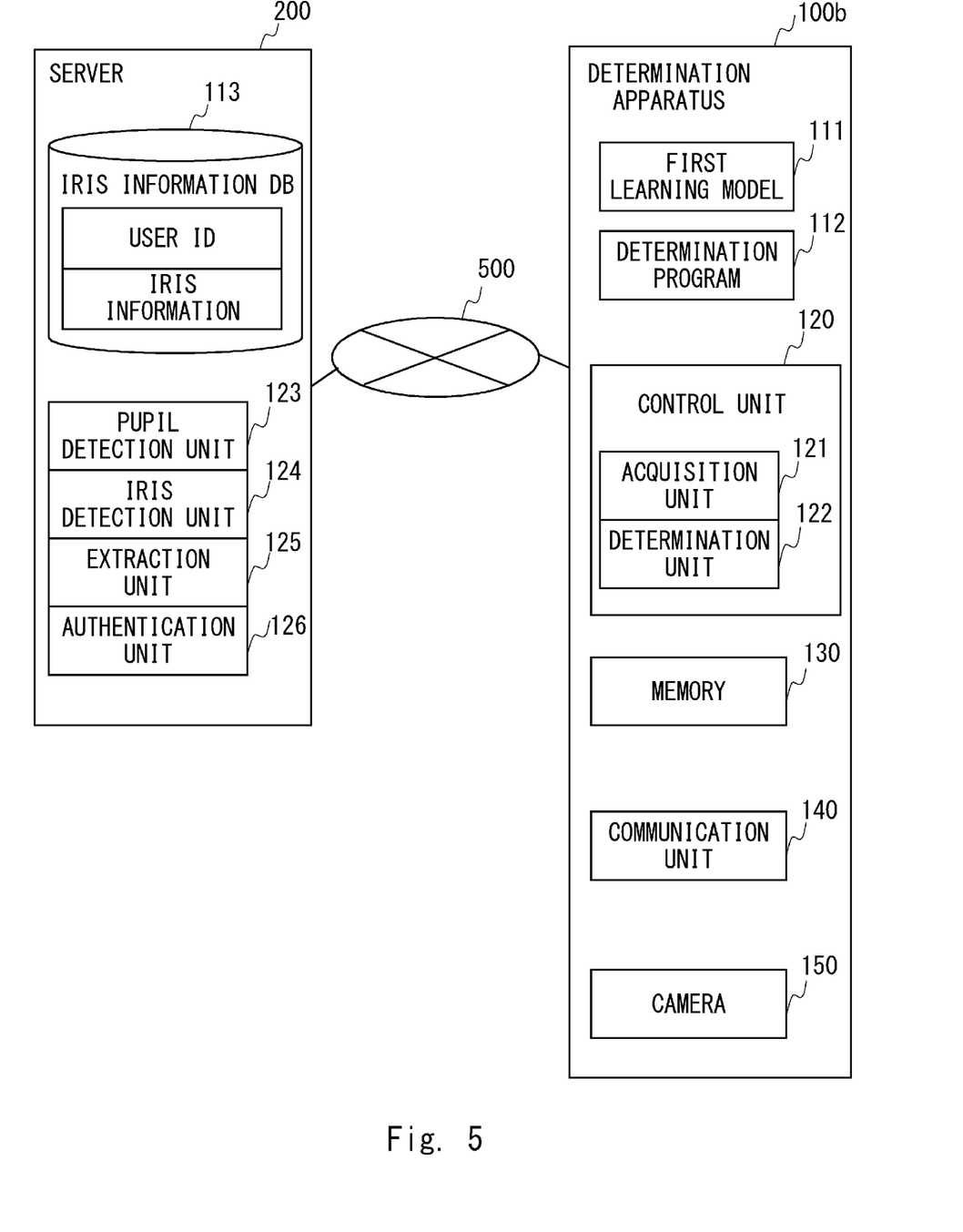
FIG. 5 is a block diagram showing a configuration of a determination apparatus according to a third example embodiment.

FIG. 5 is a block diagram showing a configuration of a determination apparatus 100b according to a third example embodiment. The determination apparatus 100b is connected to a network 500. The network 500 may be a wired or wireless network. A server 200 is connected to the network 500. Note that a system including the determination apparatus 100b and the server 200 corresponds to the determination apparatus 100a according to the second example embodiment.

The determination apparatus 100b, which includes a camera 150, takes a photograph image of a user, and transmits the photograph image to the server 200. The server 200 compares the received photograph image with data contained in the iris information DB 113.

Among the functions provided in the control unit 120 of the determination apparatus 100a shown in FIG. 3, the functions of the acquisition unit 121 and the first determination unit 122 are provided in the determination apparatus 100b, and the other functions are provided in the server 200. Further, in the determination apparatus 100b, the first learning model 111, which the first determination unit 122 uses, is stored. The control unit 120 of the determination apparatus 100b loads the determination program 112 into the memory 130, and executes the loaded determination program 112. In this way, the control unit 120 implements the functions of the acquisition unit 121 and the first determination unit 122.

The determination apparatus 100b performs processes in steps S201 and S202 shown in FIG. 4. When it is determined that an iris can be extracted from the photograph image (Yes in Step S202), the determination apparatus 100b makes (e.g., instructs) the server 200 perform processes in a step S203 and the subsequent steps through the network 500. According to this example embodiment, the determination apparatus 100b can reduce the processing load on the server 200 required to detect an iris.

Fourth Example Embodiment

Figure 6:
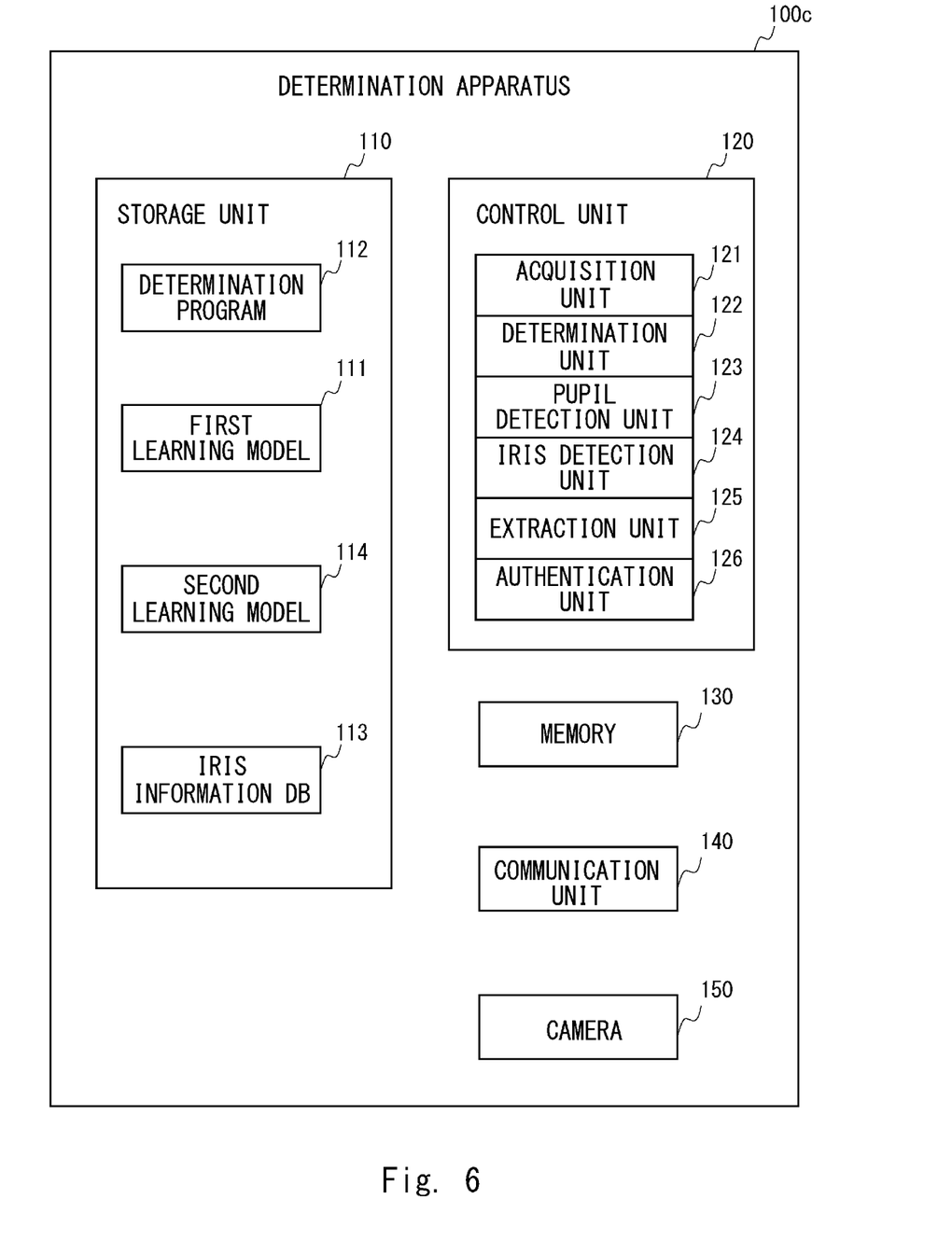
FIG. 6 is a block diagram showing a configuration of a determination apparatus according to a fourth example embodiment.

A determination apparatus 100c according to a fourth example embodiment includes the above-described first determination function and a function of detecting an iris through machine learning. FIG. 6 is a block diagram showing a configuration of the determination apparatus 100c according to the fourth example embodiment. Differences from the second example embodiment will be described hereinafter.

The storage unit 110 according to the fourth example embodiment further stores therein a second learning model 114. The second learning model 114 is constructed through machine learning using teacher data in which a plurality of images of eyes are associated with pieces of position information each of which is information about a position of a pupil or a position of an iris. Each of the plurality of images of eyes is an image from which iris information can be extracted.

The position information for a pupil is, for example, a binary image in which all the values in a pupil area in the image of the eye are 1 and all the values in the other area are 0. Such a binary image is called a first binary image. The position information for an iris is, for example, a binary image in which all the values inside the outer circle of an iris in the image of the eye are 1 and all the values in the other area are 0. Such a binary image is called a second binary image.

The second learning model 114 may be constructed through machine learning using teacher data in which a plurality of images of eyes are associated with both pieces of position information each of which is information about a position of a pupil and pieces of position information each of which is information about a position of an iris. In such a case, for example, both the first and second binary images are used as the teacher data. When both the position of the pupil and the position of the iris are used, the second learning model 114 can output a more accurate iris position.

The pupil detection unit 123 of the control unit 120 may input a photograph image into the second learning model 114 and detect a position of a pupil based on an output from the second learning model 114. The iris detection unit 124 of the control unit 120 may input a photograph image into the second learning model 114 and detect a position of an iris based on an output from the second learning model 114. Note that when the iris detection unit 124 detects an iris by using the second learning model 114, the determination apparatus 100c does not have to include the pupil detection unit 123.

Figure 7:
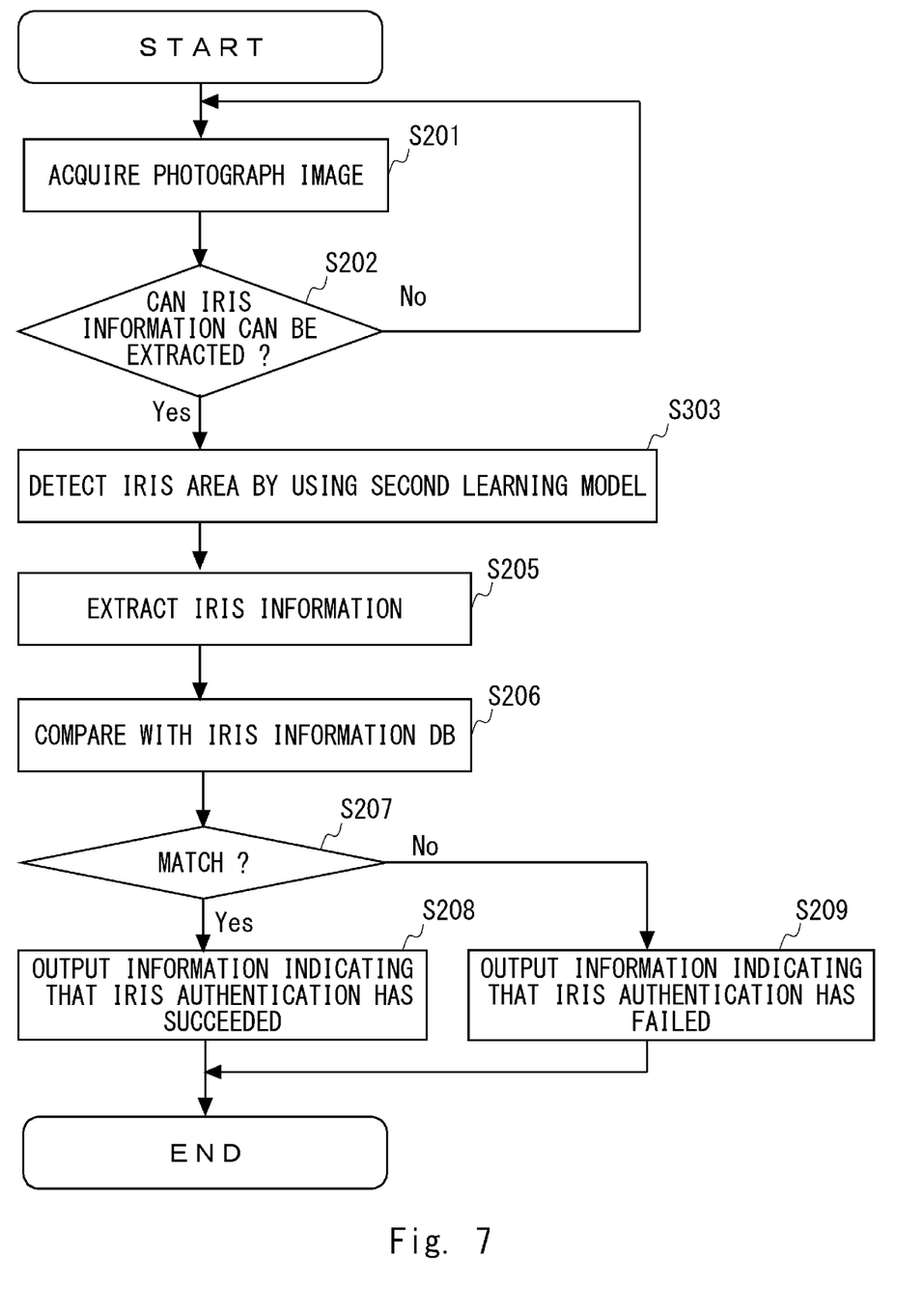
FIG. 7 is a flowchart showing a flow of iris authentication using the determination apparatus according to the fourth example embodiment.

FIG. 7 is a flowchart showing a flow of processes through which the determination apparatus 100c performs iris authentication. Since processes in steps S201 and S202 are similar to those in FIG. 4, descriptions thereof will be omitted.

When it is determined that the photograph image is appropriate in the step S202 (Yes in Step S202), the determination apparatus 100c detects an iris area by using the second learning model 114 (Step S303). For example, the iris detection unit 124 inputs the photograph image into the second learning model 114 and detects a position of an iris based on an output result thereof.

Further, for example, the pupil detection unit 123 inputs the photograph image into the second learning model 114 and detects a position of a pupil based on an output result thereof. The iris detection unit 124 can detect the position of an iris in a manner similar to the step S204 in FIG. 4. Since processes in steps S205 to S209 are similar to those in FIG. 4, descriptions thereof will be omitted.

Advantageous effects of this example embodiment will be described hereinafter. When iris information is extracted from a photograph image, it is necessary to detect a pupil therefrom. However, there were cases where a pupil area could not be detected as a perfect circle due to a part of eyelashes or glasses that overlaps the pupil area or the like, noises or vibrations that occur during the image acquisition process, or the like. Further, there are cases where the shape of a pupil area is not a perfect circle due to astigmatism or the like. Since the determination apparatus according to this example embodiment detects an iris by using a machine learning model (i.e., a machine-trained model), it is possible to detect the iris even when the shape of the pupil area is not a perfect circle.

Fifth Example Embodiment

Figure 8:
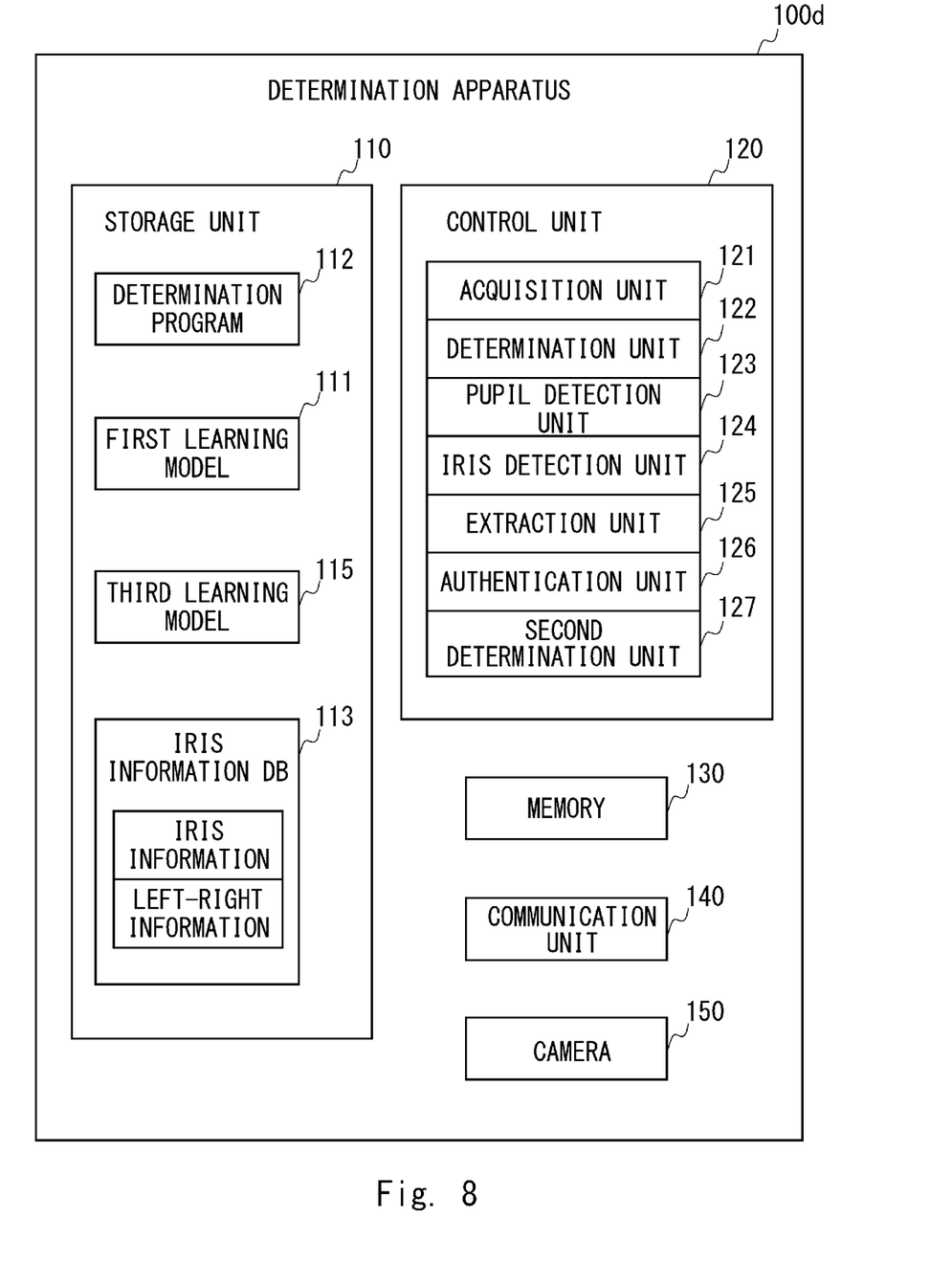
FIG. 8 is a block diagram showing a configuration of a determination apparatus according to a fifth example embodiment.

A determination apparatus 100d according to a fifth example embodiment includes the above-described first determination function and a function of determining a right eye and a left eye through machine learning. FIG. 8 is a block diagram showing a configuration of the determination apparatus 100d according to the fifth example embodiment. Differences from the second example embodiment will be described hereinafter.

The storage unit 110 according to the fifth example embodiment further stores therein a third learning model 115. The third learning model 115 is constructed through machine learning using teacher data in which a plurality of images of eyes are associated with labels each of which is a label for distinguishing between a right eye and a left eye. In the iris information DB 113 of the storage unit 110, pieces of iris information and pieces of left-right information are stored in a state in which the pieces of iris information are associated with respective pieces of left-right information. The left-right information is identification information for distinguishing between a right eye and a left eye.

Images of eyes may be registered in the iris information DB 113. In such a case, the images of eyes may be registered in the iris information DB 113 in a state in which each of the images of eyes is assigned meta-information indicating whether that image indicates a right eye or a left eye.

A second determination unit 127 of the control unit 120 determines whether or not an image of an eye shown in a photograph image is a left eye or a right eye by using the third learning model 115. The second determination unit 127 inputs a photograph image into the third learning model 115 and determines whether or not the photograph image is an image of a right eye or an image of a left eye based on an output from the third learning model 115.

Figure 9:
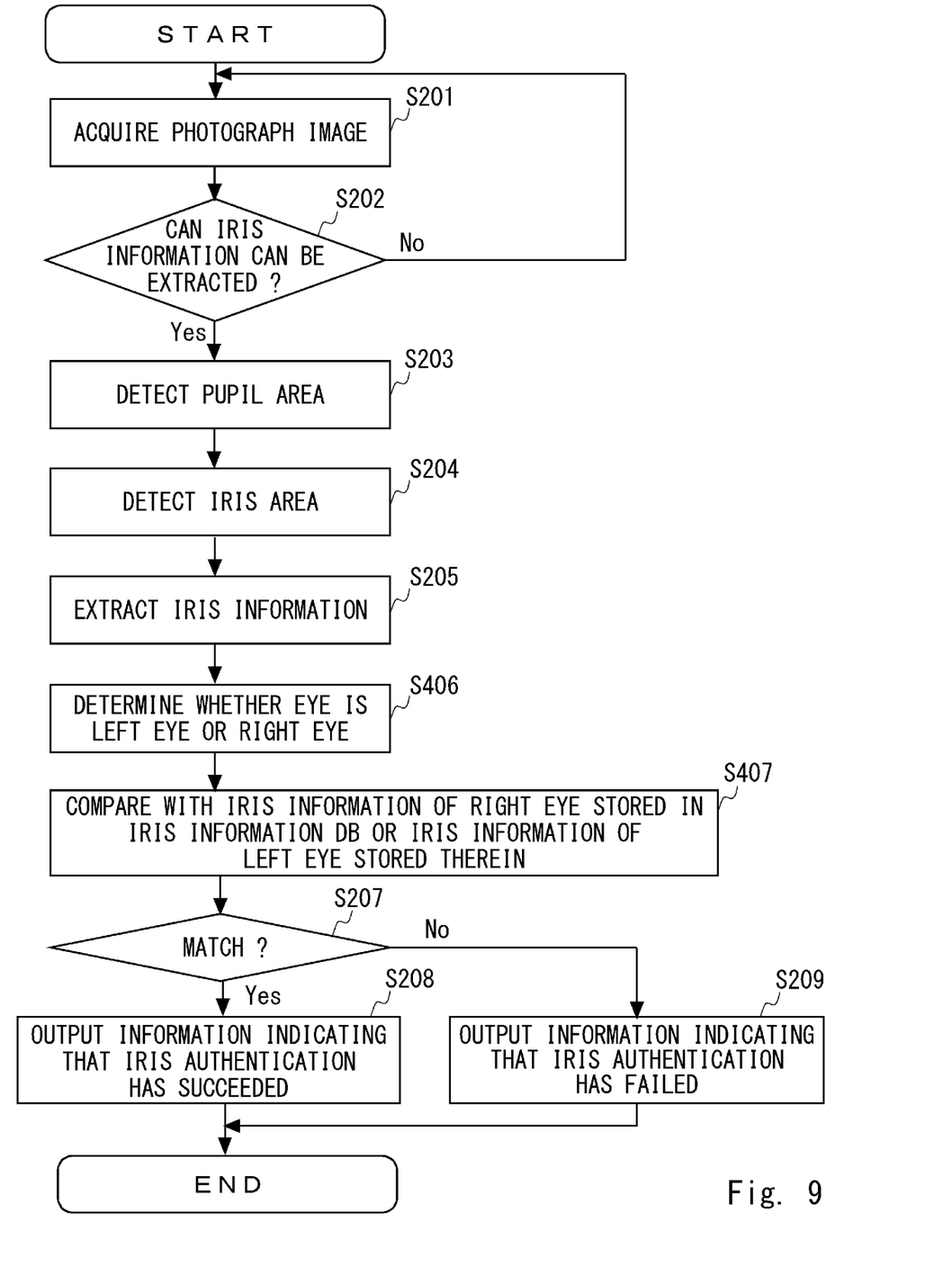
FIG. 9 is a flowchart showing a flow of iris authentication processing using the determination apparatus according to the fifth example embodiment.

FIG. 9 is a flowchart showing a flow of processes through which the determination apparatus 100*d* performs iris authentication. Since processes in steps S201 to S205 and steps S207 to S209 are similar to those in FIG. 4, descriptions thereof will be omitted.

After the iris information is extracted in the step S205, the second determination unit 127 inputs the photograph image into the third learning model 115 and determines whether or not the photograph image is an image of a right eye or an image of a left eye based on an output from the third learning model 115 (Step S406).

After the step S406, the authentication unit 126 compares the photograph image with iris information of either a right eye or a left eye stored in the iris information DB 113 (Step S407). When it is determined that the photograph image is an image of a right eye in the step S406, the authentication unit 126 compares the photograph image with iris information associated with left-right information indicating a right eye. When it is determined that the photograph image is an image of a left eye in the step S406, the authentication unit 126 compares the photograph image with iris information associated with left-right information indicating a left eye. Note that the process in the step S406 may be performed before the process for detecting a pupil area in the step S203.

A case where eye images assigned meta-information are registered in the iris information DB 113 will be described. In such a case, the authentication unit 126 compares an image determined as a right eye by the third learning model 115 with an image of a right eye registered in the iris information DB 113. The authentication unit 126 compares an image determined as a left eye by the third learning model 115 with an image of a left eye registered in the iris information DB 113.

Note that images of right eyes and images of left eyes may be registered in respective different databases. In such a case, the authentication unit 126 compares the image determined as a right eye by the third learning model 115 with data contained in the database in which images of right eyes are registered. Similarly, the authentication unit 126 compares the image determined as a left eye by the third learning model 115 with data contained in the database in which images of left eyes are registered.

When iris information is registered, the determination apparatus 100*d*, after performing the process in the step S406, associates the iris information extracted in the step S205 with left-right information that has been determined according to the result of the determination in the step S406, and registers them in the iris information DB 113.

Advantageous effects of this example embodiment will be described hereinafter. There are cases where both pieces of iris information of left eyes and pieces of iris information of right eyes are registered in a database of an iris authentication apparatus. In such a case, according to related art, an acquired eye image has to be compared with all the eye images registered in the database. In the determination apparatus 100*d* according to this example embodiment, an acquired eye image is compared with, among all the eye images registered in the database, either the left eye images or the right eye images, so that the comparison time can be reduced and hence the processing load for the comparison can be reduced.

Modified Example

Note that the disclosure is not limited to the above-described example embodiments, and they may be modified as appropriate without departing from the scope and spirit of the disclosure. Each of the determination apparatuses 100*a*, 100*b*, 100*c* and 100*d* may include a display control unit that displays an acquired eye image, iris information, a photograph image, a result of iris authentication, and the like on a display device such as a display. The result of iris authentication may include one or both of the photograph image and the registered image, which have been compared with each other, and may also include an indication such as "OK", "NG", or "Error". The registered image is an image of an eye registered in the iris information DB 113.

When the display control unit displays an image of an eye, it may highlight an area that the apparatus itself has recognized (i.e., determined) as an iris area, and a pupil area. The display control unit may be designed so as to make (e.g., instruct) the display device display some of the processes or the whole flow in the above-described example embodiments.

Note that the above-described example embodiments have been described as hardware configurations, but the disclosure is not limited to the hardware configurations. The disclosure may also be implemented by causing a CPU to execute a computer program.

In the above-described examples, the program can be stored and provided to a computer using any type of non-transitory computer readable media. Non-transitory computer readable media include any type of tangible storage media. Examples of non-transitory computer readable media include magnetic storage media (floppy disks, magnetic tapes, hard disk drives), optical magnetic storage media (e.g., magneto-optical disks), CD-ROM (Read Only Memory), CD-R, CD-R/W, DVD (Digital Versatile Disc), and semiconductor memories (e.g., mask ROM, PROM (Programmable ROM), EPROM (Erasable PROM), flash ROM, and RAM (Random Access Memory)). Further, the program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the disclosure is not limited to the above-described example embodiments, and they may be modified as appropriate without departing from the scope and spirit of the disclosure. Further, the disclosure may be implemented by combining example embodiments with one another.

Although the disclosure has been described with reference to example embodiments (and examples), the disclosure is not limited to the above-described example embodiments (and examples). The configuration and details of the disclosure may be modified within the scope of the disclosure in various ways that can be understood by those skilled in the art.

REFERENCE SIGNS LIST

100, 100*a*, 100*b*, 100*c*, 100*d* DETERMINATION APPARATUS
101, 121 ACQUISITION UNIT
102, 122 FIRST DETERMINATION UNIT
110 STORAGE UNIT
111 FIRST LEARNING MODEL

112 DETERMINATION PROGRAM
113 IRIS INFORMATION DB
114 SECOND LEARNING MODEL
115 THIRD LEARNING MODEL
123 PUPIL DETECTION UNIT
124 IRIS DETECTION UNIT
125 EXTRACTION UNIT
126 AUTHENTICATION UNIT
127 SECOND DETERMINATION UNIT
130 MEMORY
140 COMMUNICATION UNIT
150 CAMERA
200 SERVER
500 NETWORK

What is claimed is:

1. An iris information extraction apparatus comprising:
at least one memory storing:
instructions; and
a first learning model constructed through machine learning using teacher data in which a plurality of images of eyes are associated with labels that each indicate whether or not an iris can be extracted; and
a second learning model constructed through machine learning using teacher data in which a plurality of images of eyes are associated with pieces of position information each of which is information about a position of a pupil or a position of an iris; and
at least one processor configured to execute the instructions to:
acquire a photograph image obtained by photographing a user;
input the photograph image into the first learning model and determine whether or not iris information can be extracted based on an output from the first learning model;
perform iris authentication or iris registration based on the photograph image according to a result of the determination;
input the photograph image into the second learning model and detect the position of the pupil or the position of the iris based on an output from the second learning model; and
display the photograph image emphasizing a pupil region based on the position of the pupil or an iris region based on the position of the iris.

2. The iris information extraction apparatus according to claim 1, wherein
the at least one memory stores a third learning model constructed through machine learning using teacher data in which a plurality of images of eyes are associated with labels each of which is a label for distinguishing between a right eye and a left eye, and
the at least one processor is further configured to execute the instructions to:
input the photograph image into the third learning model and determine whether or not the photograph image is an image of a right eye or an image of a left eye based on an output from the third learning model.

3. An iris information extraction method performed by a computer and comprising:
storing a first learning model constructed through machine learning using teacher data in which a plurality of images of eyes are associated with labels that each indicate whether or not an iris can be extracted;
storing a second learning model constructed through machine learning using teacher data in which a plurality of images of eyes are associated with pieces of position information each of which is information about a position of a pupil or a position of an iris;
acquiring a photograph image obtained by photographing a user;
inputting the photograph image into the first learning model and determine whether or not iris information can be extracted based on an output from the first learning model;
performing iris authentication or iris registration based on the photograph image according to a result of the determination;
inputting the photograph image into the second learning model and detect the position of the pupil or the position of the iris based on an output from the second learning model; and
displaying the photograph image emphasizing a pupil region based on the position of the pupil or an iris region based on the position of the iris.

4. A non-transitory computer readable medium storing an iris information extraction program executable by a computer to perform processing comprising:
storing a first learning model constructed through machine learning using teacher data in which a plurality of images of eyes are associated with labels that each indicate whether or not an iris can be extracted;
storing a second learning model constructed through machine learning using teacher data in which a plurality of images of eyes are associated with pieces of position information each of which is information about a position of a pupil or a position of an iris;
acquiring a photograph image obtained by photographing a user;
inputting the photograph image into the first learning model and determine whether or not iris information can be extracted based on an output from the first learning model;
performing iris authentication or iris registration based on the photograph image according to a result of the determination;
inputting the photograph image into the second learning model and detect the position of the pupil or the position of the iris based on an output from the second learning model; and
displaying the photograph image emphasizing a pupil region based on the position of the pupil or an iris region based on the position of the iris.

* * * * *